US012095181B2

(12) United States Patent
Carceller et al.

(10) Patent No.: US 12,095,181 B2
(45) Date of Patent: Sep. 17, 2024

(54) ANTENNA APPARATUS WITH INTEGRATED FILTER

(71) Applicant: Kyocera International, Inc., San Diego, CA (US)

(72) Inventors: Carlos Carceller, San Diego, CA (US); Andy Piloto, San Diego, CA (US); Kawthar A. Zaki, Potomac, MD (US); Ali Atia, Potomac, MD (US); Joseph Tallo, San Diego, CA (US); Tyler Reid, San Diego, CA (US)

(73) Assignee: Kyocera International, Inc., San Diego, CA (US)

( * ) Notice: Subject to any disclaimer, the term of this patent is extended or adjusted under 35 U.S.C. 154(b) by 0 days.

(21) Appl. No.: 18/200,982

(22) Filed: May 23, 2023

(65) Prior Publication Data

US 2023/0299488 A1 Sep. 21, 2023

Related U.S. Application Data

(63) Continuation of application No. 17/953,589, filed on Sep. 27, 2022, now Pat. No. 11,677,154, which is a continuation of application No. 16/743,248, filed on Jan. 15, 2020, now Pat. No. 11,469,506.

(60) Provisional application No. 62/884,855, filed on Aug. 9, 2019, provisional application No. 62/793,772, filed on Jan. 17, 2019.

(51) Int. Cl.

| | |
|---|---|
| ***H01Q 1/48*** | (2006.01) |
| ***H01Q 9/04*** | (2006.01) |
| ***H01Q 21/00*** | (2006.01) |
| ***H01Q 21/06*** | (2006.01) |

(52) U.S. Cl.

CPC ............. *H01Q 9/0414* (2013.01); *H01Q 1/48* (2013.01); *H01Q 9/0435* (2013.01); *H01Q 9/0457* (2013.01); *H01Q 9/0478* (2013.01); *H01Q 21/0087* (2013.01); *H01Q 21/065* (2013.01)

(58) Field of Classification Search

CPC ...... H01Q 9/0414; H01Q 1/48; H01Q 9/0435; H01Q 9/0457; H01Q 9/0478; H01Q 21/0087; H01Q 21/065

See application file for complete search history.

(56) References Cited

U.S. PATENT DOCUMENTS

| | | | |
|---|---|---|---|
| 2012/0293279 A1 | 11/2012 | Gong et al. | |
| 2014/0118206 A1 | 5/2014 | Hendry et al. | |
| 2014/0198004 A1 | 7/2014 | Richards et al. | |
| 2017/0294717 A1 | 10/2017 | Zhang et al. | |
| 2020/0212585 A1 * | 7/2020 | Chayat .................. | H01Q 5/378 |

OTHER PUBLICATIONS

Dong, Yazhou et al.; "Broadband Circularly Polarized Filtering Antennas;" Nov. 27, 2018; IEEE Access, vol. 6, pp. 76302-76312; US.

* cited by examiner

*Primary Examiner* — Graham P Smith

(57) ABSTRACT

An antenna apparatus includes an antenna integrated with a filter. The antenna apparatus includes a plurality of resonators where at least some of the resonators are each enclosed in a metal cavity and at least one resonator is exposed to free space to form a radiator element. The antenna apparatus has a filter transfer function that is at least partially determined by dimensions of the radiator element and the position of the radiator element within the antenna apparatus.

17 Claims, 16 Drawing Sheets

200

ANTENNA APPARATUS WITH INTEGRATED FILTER

CLAIM OF PRIORITY UNDER 35 U.S.C. § 119

The present application is a continuation of and claims priority to U.S. application Ser. No. 17/953,589, filed Sep. 27, 2022 and entitled "ANTENNA APPARATUS WITH INTEGRATED FILTER," which is a continuation of and claims priority to U.S. application Ser. No. 16/743,248, filed Jan. 15, 2020 and entitled "ANTENNA APPARATUS WITH INTEGRATED FILTER," which claims priority to Provisional Application No. 62/793,772, entitled "Multi-patch Antenna Having An Intrinsic Filtering Behavior" and filed Jan. 17, 2019, and to Provisional Application No. 62/884,855, entitled "5G Phased Array Antenna Modules" and filed on Aug. 9, 2019, which are all assigned to the assignee hereof and hereby expressly incorporated by reference in their entirety.

RELATED PATENT APPLICATIONS

The present application is related to U.S. patent application Ser. No. 16/743,272, entitled "ANTENNA APPARATUS WITH INTEGRATED FILTER HAVING STACKED PLANAR RESONATORS", and to U.S. application Ser. No. 16/743,322, entitled "ANTENNA ARRAY HAVING ANTENNA ELEMENTS WITH INTEGRATED FILTERS", both assigned to the assignee hereof and hereby expressly incorporated by reference herein.

FIELD

This invention generally relates to wireless communications and more particularly to antennas and antenna filters.

BACKGROUND

In wireless communication systems, antennas are used to receive and/or transmit electromagnetic signals. During transmission, electrical energy is emitted while during reception, electrical energy is captured. In Radio Frequency (RF) systems, filters are placed behind antennas to reject any interference outside of the band of interest of the system. Filters are typically designed as an interconnection of resonators that are properly coupled to operate in the desired band while providing adequate selectivity. The resonant frequency of such a structure is directly related to physical dimensions of the resonators and the overall structure. Typically, resonance is achieved when the physical dimensions of the resonator approach a half wavelength.

SUMMARY

An antenna apparatus includes an antenna integrated with a filter. The antenna apparatus includes a plurality of resonators where at least some of the resonators are each enclosed in a metal cavity and at least one resonator is exposed to free space to form a radiator element. The antenna apparatus has a filter transfer function that is at least partially determined by dimensions of the radiator element and the position of the radiator element within the antenna apparatus.

DETAILED DESCRIPTION

Figure 1A:
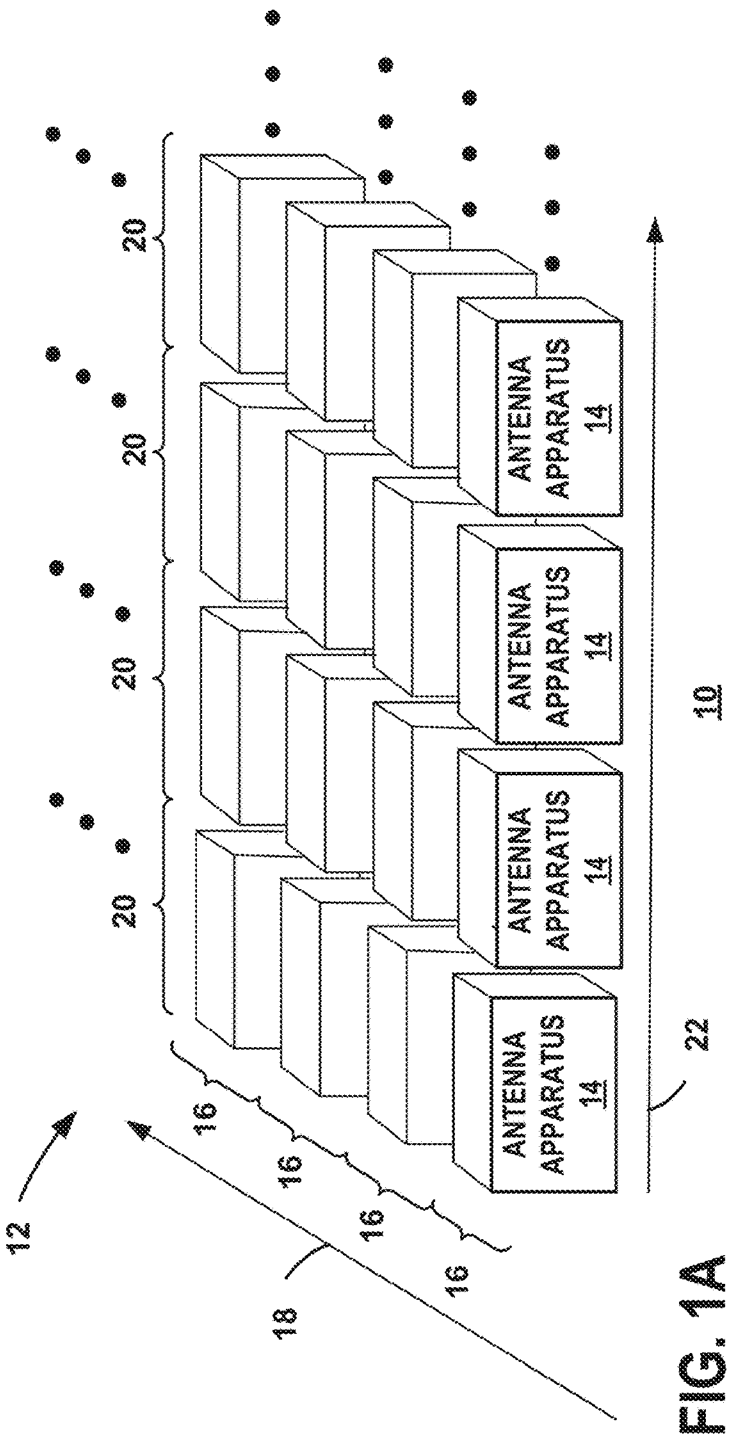
FIG. 1A is a block diagram of a phased array antenna including a plurality of antenna elements where each antenna element includes an antenna apparatus with an integrated filter.

As discussed above, filters are connected to antennas in RF systems to reject interference outside of the band of interest. Since antennas do not provide the required selectivity in most situations, antennas and filters are designed separately and then interconnected to achieve the required functionality. Filters are typically designed as an interconnection of resonators which are appropriately coupled to operate in the desired band while providing adequate selectivity, and proper passband impedance match. Phased array antennas include several antenna elements where each antenna element is connected to a filter. Often in conventional systems, the grid spacing of the antenna elements is such that each filter cannot be positioned adjacent to the corresponding antenna element. As a result, the connection between the filter and the antenna element may include a wire, microstrip, stripline, conductive trace, or other conductive connection that introduces signal loss. In addition, in conventional systems, the filters and the antenna elements are typically implemented separately requiring impedance matching networks to be interposed between the filter and antenna element. This may result in additional loss and a decrease in scan volume. In phased arrays, the active impedance seen by the antenna changes with the scan angle, thus the impedance matching networks must offer a compromise between the different active impedances seen by the antenna in order to achieve a certain return loss level for all angles within the scan volume.

In accordance with the examples discussed herein, each antenna element of the phased array antenna comprises an antenna apparatus which is a radiating structure having the same intrinsic behavior as a filter. As a result, the filter is part of each antenna element and the phased array antenna provides filtering. Each integrated filter antenna apparatus forming the antenna element can be implemented to accommodate much smaller grid spacing than those possible with conventional techniques where the filters are implemented within the grid spacing. As a result, lossy connections between the radiators and filters are eliminated while scan volume is increased with smaller grid spacing as compared to conventional antennas.

The design methodology of filters is applied in order to create a radiating structure (antenna) that has the same intrinsic behavior as a filter to implement an antenna apparatus forming an antenna element. For example, signals that fall within a limited passband are transmitted and received while signals outside the passband are rejected (or at least significantly attenuated). As a result, both functionalities (radiation and filtering) are combined in a single structure. Although conventional antennas may have inherent filtering characteristics where some frequencies are attenuated, the examples of the antenna apparatus discussed herein are designed to have a particular desired filter transfer function by selecting dimensions of the resonators, radiator and the overall structure, as well as selecting dimensions related to the relationship between the radiator and the rest of the structure. Therefore, the structure is configured to obtain the desired overall frequency response by taking into account the interaction between the radiator and the other components including the filter components. In addition, interconnects can be eliminated, reducing ohmic losses to form a compact structure. The compact structure may be beneficial in many circumstances both for a standalone single antenna system and for a multiple element antenna array. As discussed above, the compact structure of the antenna apparatus allows for implementing the antenna apparatus as each antenna element within a phased array antenna where the grid spacing is half a wavelength or less. The phased array antenna, therefore, includes filtering functionality. The resulting phased array structure with integrated filtering has a design characteristic where the design parameters of the filter determine, among other performance characteristics, the scan volume. Since the dimensions of the radiating element of each antenna element are at least partially limited by the dimensions of the components of the resonators of the antenna apparatus, selection of the resonator dimensions limits the dimensions of the grid spacing of the phased array antenna. The scan volume is at least partially determined by the grid spacing and, therefore, is dependent on at least one dimension of one of the resonators in the antenna apparatuses.

In some examples discussed below, an antenna apparatus includes a number of metallic patch resonators that are enclosed within metallic cavities, vertically stacked and mutually coupled. With one technique, the coupling between the metallic patches is achieved with precisely shaped openings in the ground plane, or irises. In other situations, interlayer electrical connections using metal posts, sometimes referred to as vias, are used to couple the metallic patches.

One advantage of the discussed structure is the use of one of the resonators (radiating resonator) as a radiator. The radiating resonator is not completely enclosed, allowing the structure to radiate into free space and act as an antenna. Through dimensional control in all three space dimensions and coupling to both free space and the resonator below, a filter which radiates into free space is formed. Therefore, the filtering transfer function of the antenna apparatus is at least partially based on the distance between the radiator element (resonator element exposed to free space) and another component of the antenna apparatus such as ground patch between the radiator element and another resonator metallic patch.

FIG. 1A is a block diagram of a phased array antenna 10 including a plurality of antenna elements 12 where each antenna element includes an antenna apparatus 14 with an integrated filter. For the example, the plurality of antenna elements 12 are secured in a frame or other assembly (not shown) such that the antenna elements 12 remain fixed in position relative to the other antenna elements. In some situations, the entire phased array structure can be moved and directed as a single unit. In typical implementations, each antenna element is connected to other circuitry such that the phase of transmitted and/or received signals can be manipulated to change the direction and/or shape of the antenna beam formed by the phase array antenna.

The antenna elements are separated from each other by a grid spacing where the dimensions of the antenna elements 12 typically determine the grid spacing. Since the antenna elements are not necessarily square, the grid spacing 16 in a first dimension (e.g., width) 18 may be different from the grid spacing 20 in a second dimension (e.g., length) 22 of the phased array grid. The phased array antenna may include any number of antenna elements. For the example in FIG. 1A, a four by four array is shown including black dots to indicate that additional antenna elements may be included in both dimensions 18, 22. An array may include any number of elements where typical numbers range from 16 to thousands. The number of antenna elements and grid spacing in each orientation typically depend on the particular application of the antenna array. For base stations operating in accordance with 5G specifications, antenna arrays typically have 64 elements arranged in an 8 by 8 configuration. Multiple antennas can also be operated together to form bigger arrays, for instance of 128, 256, 512, 1024 element or other configurations. For indoor applications and mobile devices, the array sizes are smaller, typically having 16 elements configured in 4×4 or 2×8 arrays. In some circumstances, scan volume is greater in the horizontal dimension than in the vertical dimension where an example of a suitable grid spacing in terms of wavelength (lambda) is about 0.45 lambda by 0.65 lambda.

For the examples herein, the grid spacing is uniform along a dimension such that spacings 16 along the first dimension 18 are the same and the spacings 20 along the second dimension 22 are the same, although the first dimension spacings 16 may not be the same 3 as the second dimension spacings 20. In some situations, however, the grid spacings along at least one of the dimensions 18, 22 may not be uniform.

Figure 1B:
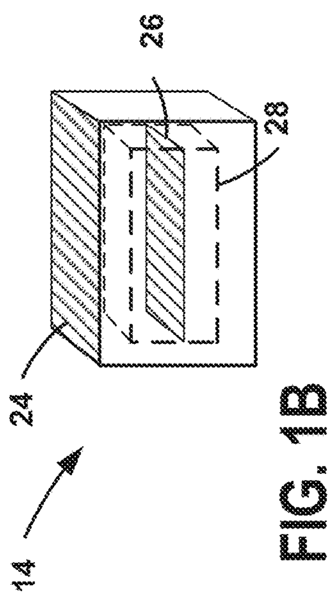
FIG. 1B is a block diagram of an example of one of the plurality antenna elements within the phased array antenna of FIG. 1A.

FIG. 1B is a block diagram of an example of one of the plurality antenna elements 12 within the phased array antenna 10 of FIG. 1A. Each of the antenna elements 12 for the examples herein is an antenna apparatus 14 that is an integrated structure including at least two resonators 24, 26 coupled to each where one of the resonators is a radiating element 24. The at least one other resonator 26 is enclosed within a metal enclosure 28.

Figure 1C:
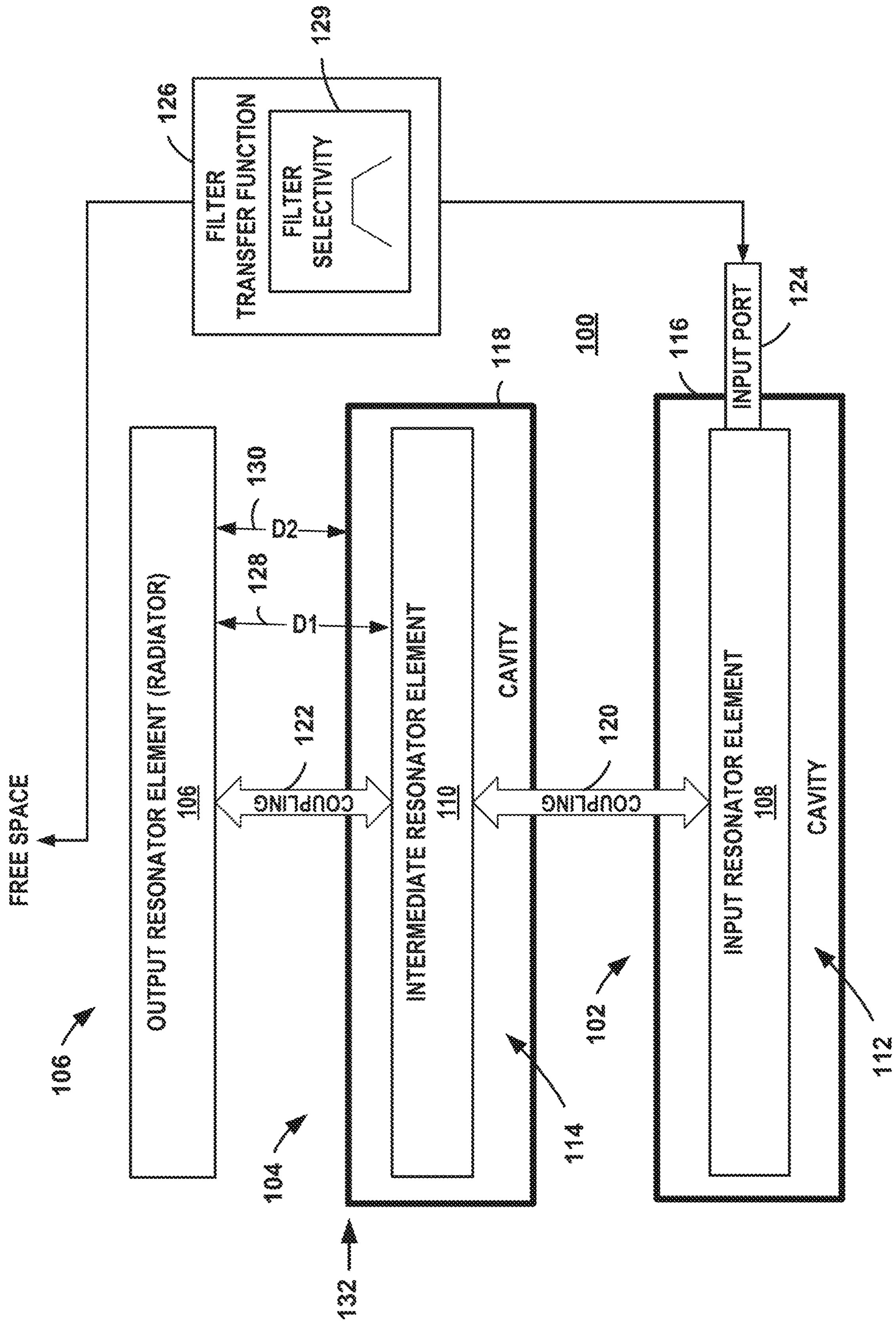
FIG. 1C is a block diagram of an antenna apparatus with an integrated filter.

FIG. 1C is a block diagram of an antenna apparatus 100 with an integrated filter. The antenna apparatus 100 is a radiating filter where at least two resonators are coupled to each other and one of the resonators is a radiator. The antenna apparatus may be used for transmission, reception, or both depending on the specific implementation. The antenna apparatus 100, therefore, is an example of the antenna apparatus 14 of FIG. 1A and FIG. 1B. For the example of FIG. 1C, the antenna apparatus 100 includes an input resonator 102, an intermediate resonator 104, and an output resonator 106 that forms the radiator. As discussed below, the antenna apparatus 100 may include several intermediate resonators 104. For the examples herein, each non-radiating resonator 102, 104 is formed with a metallic resonator element 108, 110 positioned within a cavity 112, 114 of a metallic enclosure 116, 118. The metallic enclosure 116, 118 forms an electromagnetic enclosure at the operating frequencies and, therefore, may not include continuous metal walls void of any openings. As discussed below, for example, a series of metal posts (vias) between two planar conductive patches may form the side walls of the metallic enclosure where the two planar conductive patches form the top and bottom of the metallic enclosure. In another example, metallic screen can be used to form the metallic enclosure. A dielectric (not shown in FIG. 1C) other than air is used within each cavity for the examples. A portion of one metallic enclosure may form a portion of another metallic enclosure. For example, where the resonators are implemented with planar conductive patches positioned between ground plane layers, the ground plane layer between two adjacent resonators may form the top of a lower metallic enclosure and the bottom of an upper metallic enclosure.

The resonator elements in the resonators are coupled to each other through couplings 120, 122. Each coupling 120, 122 may be formed with conductive elements such as posts or screws or may be implemented with an opening within a ground plane separating the resonator elements. As discussed below, for example, a coupling can be formed with an iris within the ground plane separating two adjacent resonator elements. Couplings 120, 122 may also be formed between non-adjacent resonator elements. Therefore, a coupling 120, 122 may be any mechanism that couples electromagnetic energy between any two resonator elements.

The input resonator 102 has an input port 124 that can be connected to a signal source or to a receiver. The input port 124, therefore, provides an interface to other devices, components and circuits. A transfer function 126 of the antenna apparatus 100 from the input port 124 through the output resonator (radiator) 106 is determined a least by the properties of the non-radiating resonators 102, 104, the couplings 120, 122, and the radiating resonator 106 and the position of the radiator relative to the other components. In most situations, the transfer function 126 also depends on the characteristics of the input port 124. The transfer function 126, therefore, can be adapted or configured to meet specific criteria by selecting dimensions of the resonators 102, 104, 106 and the couplings 120, 122 and relative position of the radiator 106 within the structure. For example, in implementations where the resonators are stacked resonator elements within ground plane enclosures and the couplings are formed with irises in the ground plane, the transfer function depends at least on the shape and size of the irises, the distance between the resonator elements, the dimensions of the resonators, the distance between the last resonator (radiator) and the adjacent ground plane, and the size of the input strip. The design of the antenna apparatus, therefore, takes into account the properties of the output resonator and the interaction of the output resonator with the other components within the antenna apparatus structure. As a result, in addition to other design parameters, the separation (distance) between the radiator 106 and the adjacent ground (underneath in the figures) is selected to realize the desired overall filter transfer function. Accordingly, the distance (D1) 128 between the radiator 106 and the adjacent resonator element 110 and the distance (D2) 130 between the radiator 106 and the ground plane of the enclosure are selected to provide the desired output coupling and transfer function. For the examples herein, the output coupling is adjusted by adjusting D1 128 and D2 130. Also, if D1 128 is changed without changing D2 130, the selectivity is changed without changing the output coupling. Therefore, the filter transfer function is typically adjusted by adjusting the distances D1 128 and D2 130.

As a result, in addition to other design parameters, the separation (distance) between the radiator 106 and the adjacent resonator element 110 is selected to realize the desired overall filter transfer function 126. More specifically, the distance (D1) 128 between the radiator 106 and the adjacent resonator element 110 impacts the selectivity 129 of the filter response of the filter transfer function 126 and the distance (D2) 130 between the radiator 106 and the adjacent ground plane 132 impacts the output coupling to free space. In the examples, the dimensions of the iris 122 impact selectivity similarly to changes in D1. For the examples discussed herein, the adjacent ground plane 132 is formed by the portion of the enclosure 118 that is adjacent to the output resonator element 106. As discussed herein, the selectivity 129 of the filter transfer function 126 is the shape of the filter response of attenuation over frequency. The selectivity 129, therefore, includes parameters such at the bandwidths of the passband(s) and stopband(s) and the characteristics of the transitions between passband(s) and stopband(s). Accordingly, at least the distance (D1) 128 between the radiator 106 and the adjacent resonator element 110 and the distance (D2) 130 between the radiator 106 and the ground plane of the enclosure are selected to provide the desired output coupling and filter response. As discussed below, the filter transfer function is also based on the dimensions of the resonator elements 106, 108, 110, and the dimensions of the structures that form the coupling between the resonators.

For the discussions herein, there is reciprocity between the antenna apparatus as a transmission device and as a reception device. Therefore, the receive and transmit properties of the antenna apparatus are identical for the examples. The characteristics, deign parameters, and configuration of the antenna apparatus discussed with reference to transmission may be applied to the antenna apparatus when used as a receiving device. Therefore, the radiator captures signals and provides an output at the input port when the antenna apparatus is used for receiving signals. More specifically, since the antenna apparatus 100 is a linear passive structure, the reciprocity theorem applies to its operation as a transmitter and receiver. Thus, the antenna apparatus 100 behaves exactly the same in transmission as in reception. In transmit mode, a signal at the input port 124 of the antenna apparatus 100 induces currents on the radiator 106 that result in transmission of electromagnetic fields to free space. In receive mode, an electromagnetic wave in free space that reaches the antenna apparatus 100 induces currents in the radiator 106 which, in turn, produce a signal at the input port 124 of the antenna.

Figure 2A:
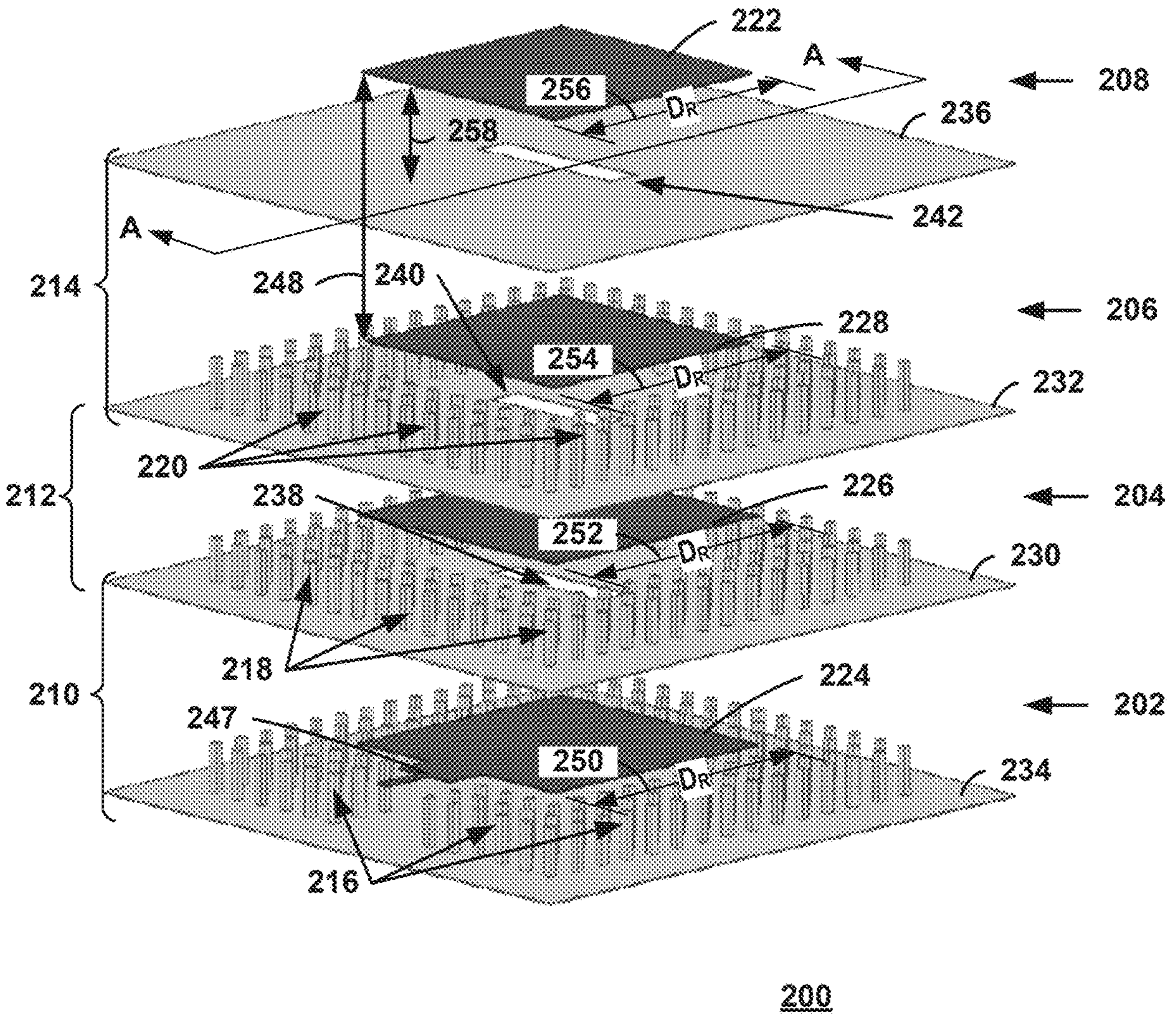
FIG. 2A is an illustration of an exploded perspective view and of an example of an antenna apparatus including planar resonator elements between ground planes where the ground planes are connected with vias and where openings in the ground planes provide coupling between the resonator elements.
Figure 2B:
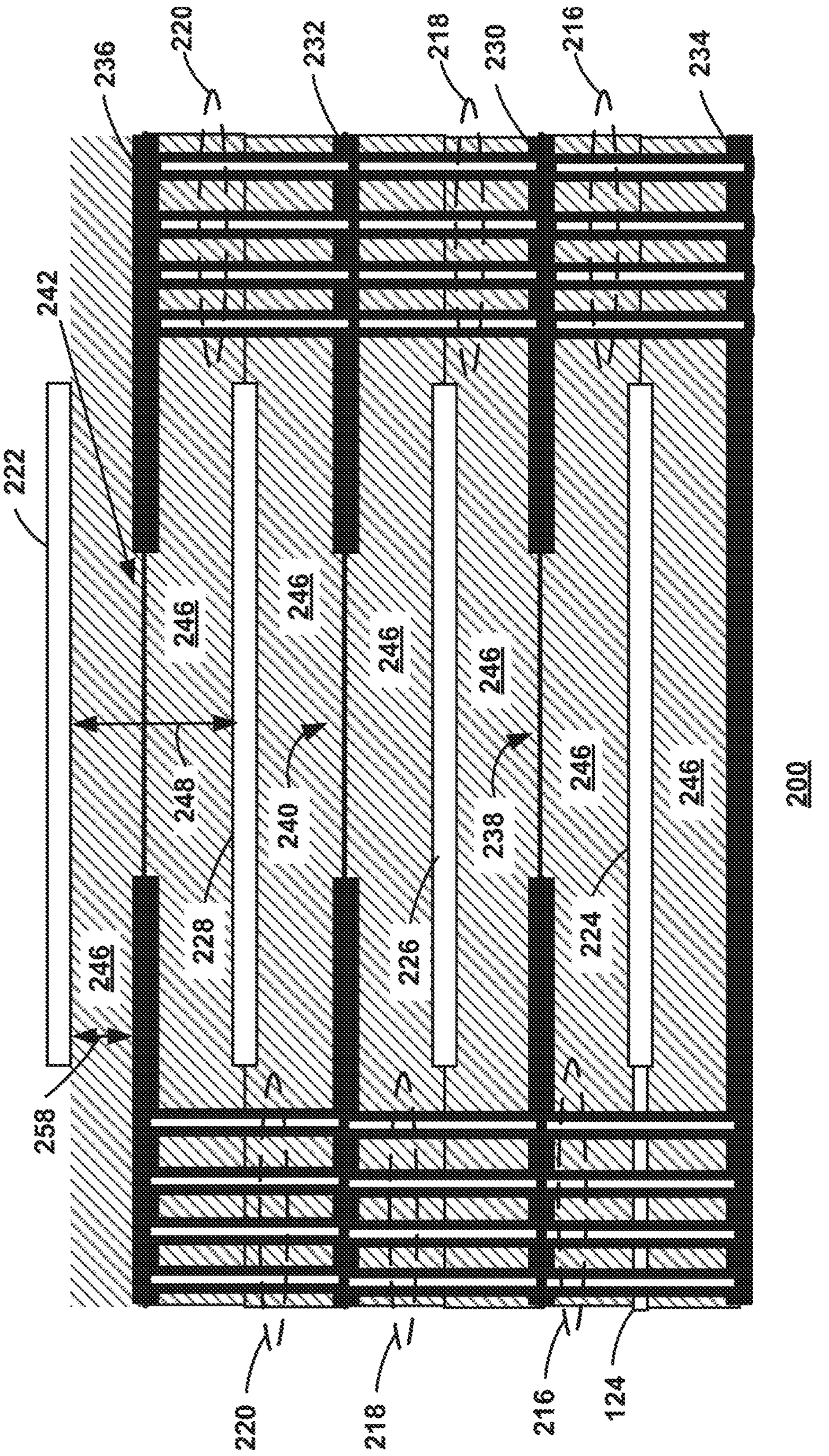
FIG. 2B is an illustration of a cross sectional side view along A-A of FIG. 2A of the antenna apparatus.
Figure 2C:
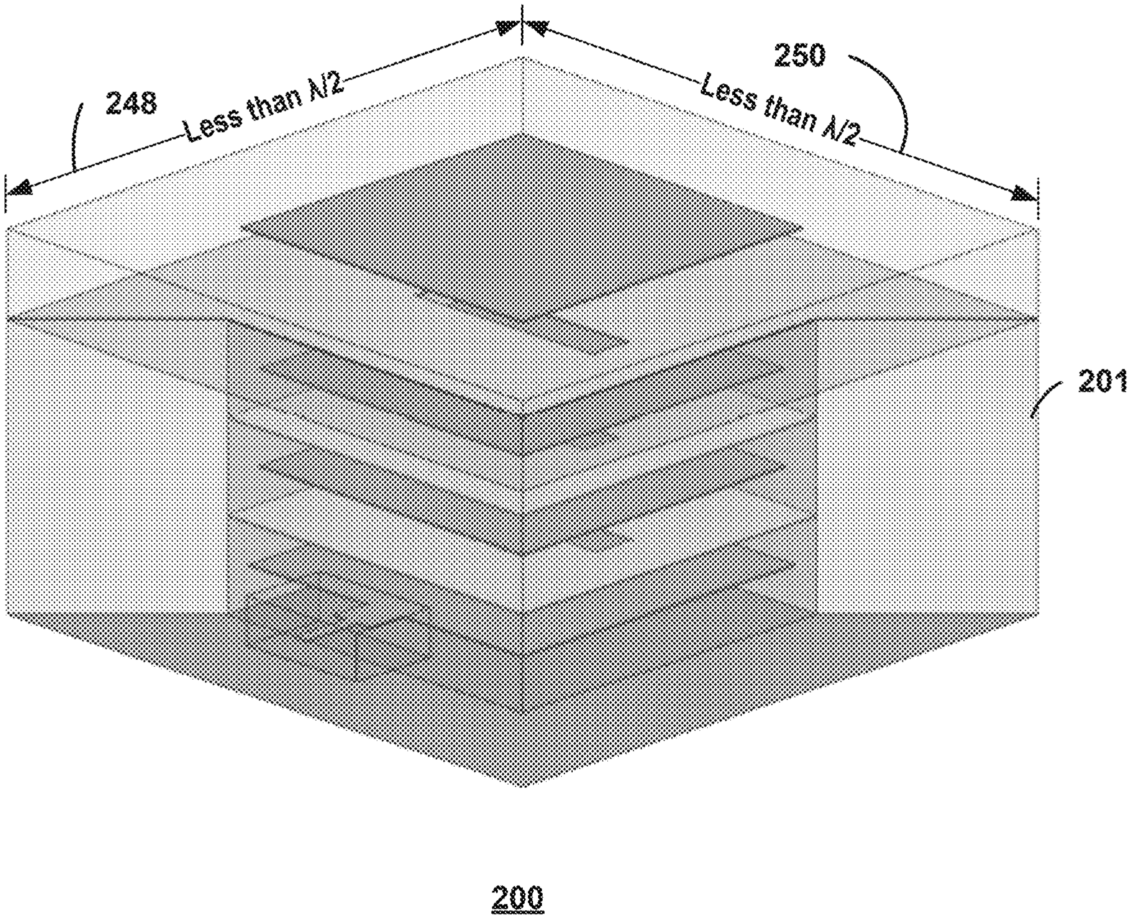
FIG. 2C is an illustration of a perspective view of the antenna apparatus showing an outer enclosure as transparent.

FIG. 2A is an illustration of an exploded perspective view and of an example of an antenna apparatus 200 including planar resonator elements between ground planes where the ground planes are connected with vias and where openings in the ground planes provide coupling between the resonator elements. FIG. 2B is an illustration of a cross sectional side view along A-A of FIG. 1C of the antenna apparatus 200. FIG. 2C is an illustration of a perspective view of the antenna apparatus 200 showing an outer enclosure 201 as transparent. FIG. 2A, FIG. 2B and FIG. 2C are not necessarily to scale and are not intended to be more than general illustrations showing the relative positioning of elements. For the examples discussed herein, an outer enclosure 201 surrounds the antenna apparatus structure expect for openings for the input port(s) and the radiator. In addition to providing additional shielding and ground connectivity, the outer enclosure 201 provides structural stability. Examples of suitable techniques for forming the outer enclosure 201 include using metal sheets, metallic vias and combinations of the two. The outer enclosure 201, however, can be omitted in some situations.

The antenna apparatus 200 for the example of FIG. 2A and FIG. 2B includes an input resonator 202, two intermediate resonators 204, 206, and an output resonator (radiator) 208. The antenna apparatus 200 of FIG. 2, therefore, is an example of the antenna apparatus 100 discussed above with reference to FIG. 1C. The resonator enclosures 210, 212, 214 for the resonators 202, 204, 206 are formed by two ground planes connected to each other with a set of vias 216, 218, 220. Other than the output resonator element 222 forming the radiator, each radiator element 224, 226, 228 is enclosed within an enclosure formed by two ground planes and a set of vias 216, 218, 220 connected between the two ground planes. The two interior ground planes 230, 232 each form a portion of two resonator enclosures 210, 212. For example, the lower intermediate ground plane 230 forms the top of the input resonator enclosure 210 for the input resonator 202 and also forms the bottom of the lower intermediate enclosure 212 for the lower intermediate resonator 204. The upper intermediate ground plane 232 forms the top of the lower intermediate enclosure 212 of the lower intermediate resonator 204 and forms the bottom of the upper intermediate resonator 214 of the upper intermediate resonator 206. For the example, the metallic patch structure forming the resonators is enclosed in an outer enclosure 201 with only the radiator exposed to free space and an opening providing access to the input port. The outer enclosure 201 is not shown in FIG. 2A and FIG. 2B.

Other than the bottom (lower) ground plane 234, the ground planes 230, 232, 236 include openings 238, 240, 242 that provide coupling between adjacent resonator elements. In other examples discussed below, the bottom ground plane may include an opening that provides coupling to a resonant cavity below the bottom ground plane. As discussed above, an opening in the ground plane that provides coupling can be referred to as an iris. The dimensions and shape of the iris dictate characteristics of the coupling. The filter transfer function of the antenna apparatus can be established, therefore, at least partially with selection of the shape and dimensions of the irises. In addition, the shape orientation of the irises and resonators determines the polarization of the antenna apparatus radiation pattern. As discussed below, the antenna apparatus can be designed to have single polarization, dual polarization, or circular polarization. The selection of the dimensions and shapes of the irises, therefore, can be used to obtain a desired filter transfer function and polarization radiation pattern.

The resonator elements and ground planes are separated from each other by a dielectric material (not shown in FIG. 2A). In one example, printed circuit board (PCB) techniques are used to form the antenna apparatus. Therefore, the ground planes and resonator elements can be formed with metallic sheets laminated on dielectric material substrates 246. For the examples discussed herein, a dielectric material having a dielectric constant greater than the dielectric constant of air is used and is illustrated as crosshatched sections in some of the figures. The figures with exploded views do not show the dielectric in the interest of clarity. For the examples, the dielectric material is uniform within the structures although, in some situations, different dielectric materials may be used. The plurality of vias between a pair of ground planes form the side walls of each resonator enclosure. The input port is formed with section of stripline 247 that extends though the lower enclosure. The input may be formed using other techniques. In another example, the input port is formed by a metal post or via that extends through the lower enclosure. When the antenna apparatus 200 is used for transmitting signals, a transmitter is connected to the input port and radio frequency (RF) signals are fed to the antenna apparatus through the input port. The RF signals are filtered by the antenna apparatus and the filtered signals radiate from the radiating element. The dimensions of the resonating element determine the resonant frequency of the resonator. For the example of FIG. 2A and FIG. 2B, each resonator element is a rectangular metallic patch and the resonator elements are slightly different in size. Although the resonators have similar sizes, the different loading of each resonator results in a difference in size. The dimension of the rectangular metallic patch that determines the resonance of the resonator is the distance that extends from the side of the input to the opposite side. For the example of FIG. 2A, therefore, the distances 250, 252, 254, 256 determine the resonant frequencies of the resonators. The desired filter response is achieved by selecting the dielectric, the length of metallic patches, the length of the irises, the spacing between the ground planes and the resonator elements, the spacing between adjacent resonator elements, and the spacing, D2, 130 between last resonator (radiator) 106 and the adjacent ground plane 132, which is the ground directly underneath the radiator in the figures. As discussed above, the distance (D1) 128 between the radiator 106 and the adjacent resonator element 110 impacts the selectivity 129 of the filter response of the filter transfer function 126 and the distance (D2) 130 between the radiator 106 and the adjacent ground plane 132 impacts the output coupling to free space. For the example of FIG. 2A and FIG. 2B, therefore, the distance 248 between the metallic patch forming the radiator 222 and the metallic patch forming the upper intermediate resonator element 228 partially determines the selectivity of the filter response. The output coupling to free space is at least partially dependent on the distance 258 between the metallic patch radiator 222 and the ground plane 236. Therefore, the distance 248 between the metallic patch radiator 222 and the metallic patch resonator element 228 is an example of the distance (D1) 128 between the radiator 106 and the adjacent resonator element 110 in FIG. 1C. The distance 258 between the metallic patch radiator 222 and the ground plane 236 is an example of the distance (D2) 130 between the radiator 106 and the ground plane 132 in FIG. 1C.

The antenna apparatus 200 is constructed to have a desired filter transfer function 126 from the input stripline 247 to free space by selecting dimensions of the resonators 202, 204, 206, 208 the characteristics of the structures forming couplings between the resonators, and the spacing between components of the resonators, as well as the dimensions of the radiator 222, the characteristics of the structure forming the coupling to the radiator 222, and the relative position of the radiator 222 to the other antenna apparatus 200 components.

As discussed below in further detail, one of the advantages of the antenna apparatus includes the ability to implement the filter and antenna in a package that is less than half wavelength (λ/2) along any side of the radiating plane. Although the antenna apparatuses can be implemented in areas with different shapes and larger sizes, it is advantageous to limit the size to less than a half wavelength (λ/2) on any side in some situations. For the example of FIG. 2C, the plane of the outer enclosure 201 where the radiator is positioned has a width 248 and length 250 that are less than a half wavelength (λ/2). In other situations, multiple antenna apparatuses are disposed in a single outer enclosure where each radiator is within an area less than λ/2 on each side. In still other situations, the dimensions of the outer enclosure 201 are such that the apparatus fits within a grid spacing that is less than λ/2 in only one orientation of an array.

Figure 3A:
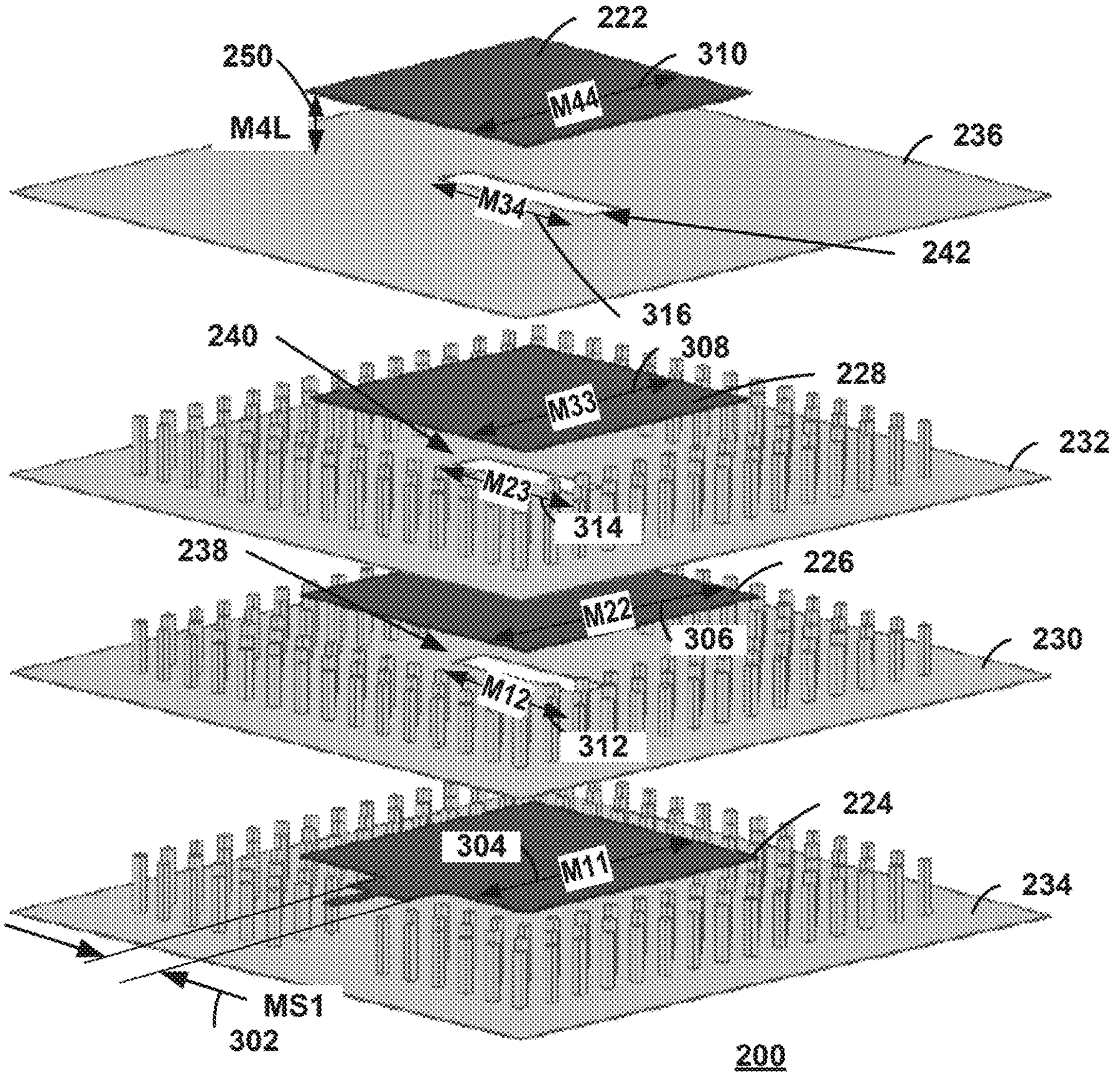
FIG. 3A is a perspective view illustration of the antenna apparatus showing modeling labels for an example of coupling matrix modeling.
Figure 3B:
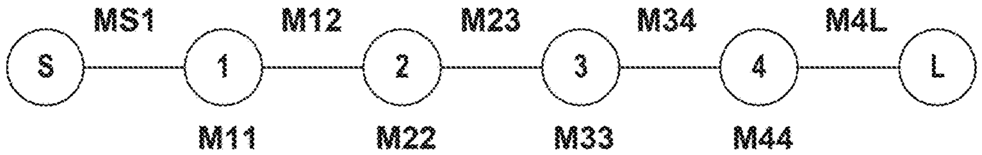
FIG. 3B is an illustration of the coupling matrix modeling relationship for the structure of FIG. 3A.

FIG. 3A is a perspective view illustration of the antenna apparatus 200 showing modeling labels for an example of coupling matrix modeling. FIG. 3B is an illustration of the coupling matrix modeling relationship for the structure of FIG. 3A. One technique for simulating filter circuits and designing filters includes a coupling matrix model which is an example of a technique that can be applied to designing an antenna apparatus in accordance with the discussions herein.

At microwave and millimeter wave frequencies, bandpass filters are frequently constructed by interconnecting (i.e. coupling) resonators. Resonators can be coupled in a cascaded connection (i.e. between adjacent resonators), which produce all-pole frequency responses, or include couplings between non-adjacent resonators, which lead to more complex frequency responses that may include transmission zeros. These filters can be modeled with a simple lumped element circuit. For a general 2-port model of a synchronous direct-coupled-resonator filter, direct-couplings (between adjacent couplings) and cross-couplings (between non-adjacent resonators) can be represented. A circuit simulator can be used to simulate the circuit response including all possible couplings (adjacent and non-adjacent) and may include synchronous resonators (formed by capacitors and inductors), admittance inverters and frequency independent admittances. An example of a suitable circuit simulator includes the NI AWR Microwave Office and Ansys Designer circuit simulator. Once the center frequency and bandwidth of the filter are defined, the filter circuit can be expressed in matrix form, known as coupling matrix. The various entries of the coupling matrix M represent the different components of the circuit. Diagonal elements represent the imaginary part of the frequency independent admittances, whereas non diagonal entries represent couplings between resonators (ie. inversion constants). This modeling and design methodology are used for simulating and designing bandpass direct-coupled-resonator filters and is one example of a technique that can be used to design the examples of the antenna apparatus discussed herein. For the example of FIG. 3A, the resonators are coupled in a cascaded connection where adjacent resonators are coupled to form an all-pole frequency response. The model can also be applied to the coupling to the radiator and from the radiator to free space.

In accordance with one example, the center frequency of the filter, bandwidth, passband equiripple return loss level and location of the transmission zero are selected. With these parameters, a coupling matrix that synthesizes this response can be analytically computed.

The coupling matrix is transformed into a real implementation by identifying the features of the physical geometry that control the various elements of the coupling matrix. Generally, for example, the size of a resonator can be altered to change its resonant frequency (ie, the corresponding diagonal element of the coupling matrix) and the size of openings created between resonators can control the amount of coupling between them. Different methodologies can be used to extract geometrical values from a circuit mode where typically the design procedure begins with obtaining an initial set of dimensions. Procedures may include looking at the input group delay, or splitting the structure into simpler blocks and comparing EM simulations with circuit simulations of equivalent blocks. After the initial dimensions are established, an optimization design procedure is applied. Therefore, the design of the antenna apparatus includes synthesizing a coupling matrix that provides the adequate passband response and out-of-band rejection needed. In order to synthesize this coupling matrix, the number of resonators (N), center frequency (f0), bandwidth (BW) and desired passband equi-ripple return loss value are determined in order to satisfy a certain rejection characteristic.

For the example of FIGS. 3A and 3B, nine geometrical dimensions are manipulated to realize the desired filter response where the geometrical dimensions include the lengths of the four metallic patches forming the resonator elements, the widths of the three openings forming the coupling between the metallic patches, the distance from the metallic patch radiator to the ground plane, and the width of the input tap. The coupling model of FIG. 3B pairs each geometric dimension with an entry of the coupling matrix. The input tap width 302 of the input stripline 247 controls MS1. The length 304 of the input resonator element 224 controls M11. The length 306 of the metallic patch forming the first intermediate resonator element 226 controls M22. The length 308 of the metallic patch forming the second intermediate resonator element 228 controls M33. The length 310 of the metallic patch forming the radiator element 222 controls M44. The length 312 of the opening 238 controls M12. The length 314 of the opening 240 controls M23. The length 316 of the opening 242 controls M34. The distance 250 between the metallic patch radiator 222 and the ground plane 236 controls M4L. By adjusting and optimizing the coupling matrix elements, including the matrix elements corresponding to the radiator characteristics, the desired transfer function of the integrated antenna apparatus that includes a filter and an antenna can be achieved.

The technique discussed above can be applied to other implementations of the antenna apparatus 100. As discussed below, other examples of the antenna apparatus 100 include implementations having dual polarization and multiple ports, implementations having circular polarization, and implementations having transmission zeros in the frequency response. By appropriately modifying and applying the design technique discussed above for a particular structure, these examples as well as other implementations can be simulated and optimized.

Figure 4A:
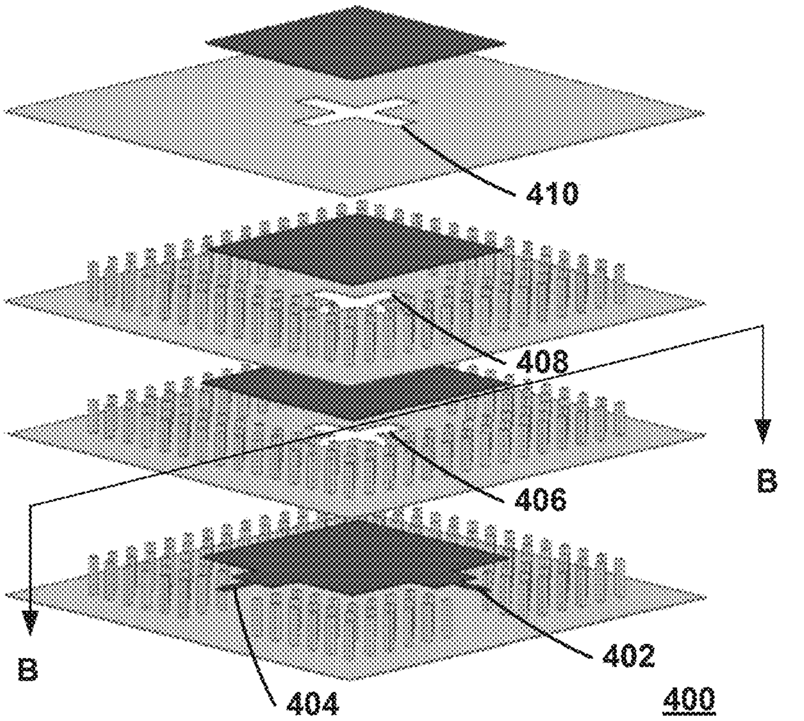
FIG. 4A is an illustration of an exploded perspective view of an example of an antenna apparatus with dual linear polarization.
Figure 4B:
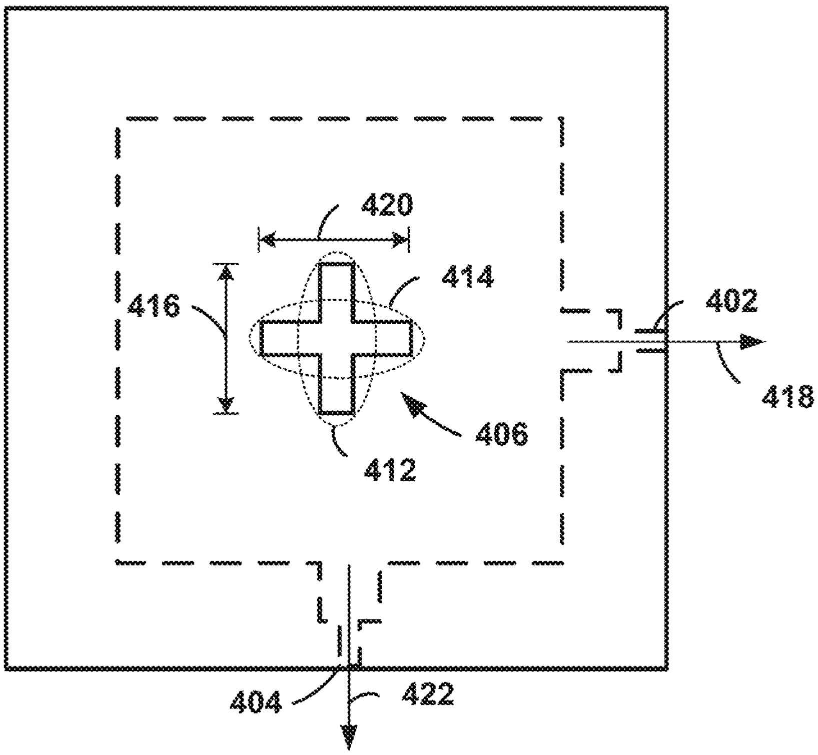
FIG. 4B is a cross-sectional top view of the antenna apparatus taken along line B-B in FIG. 4A.
Figure 5:
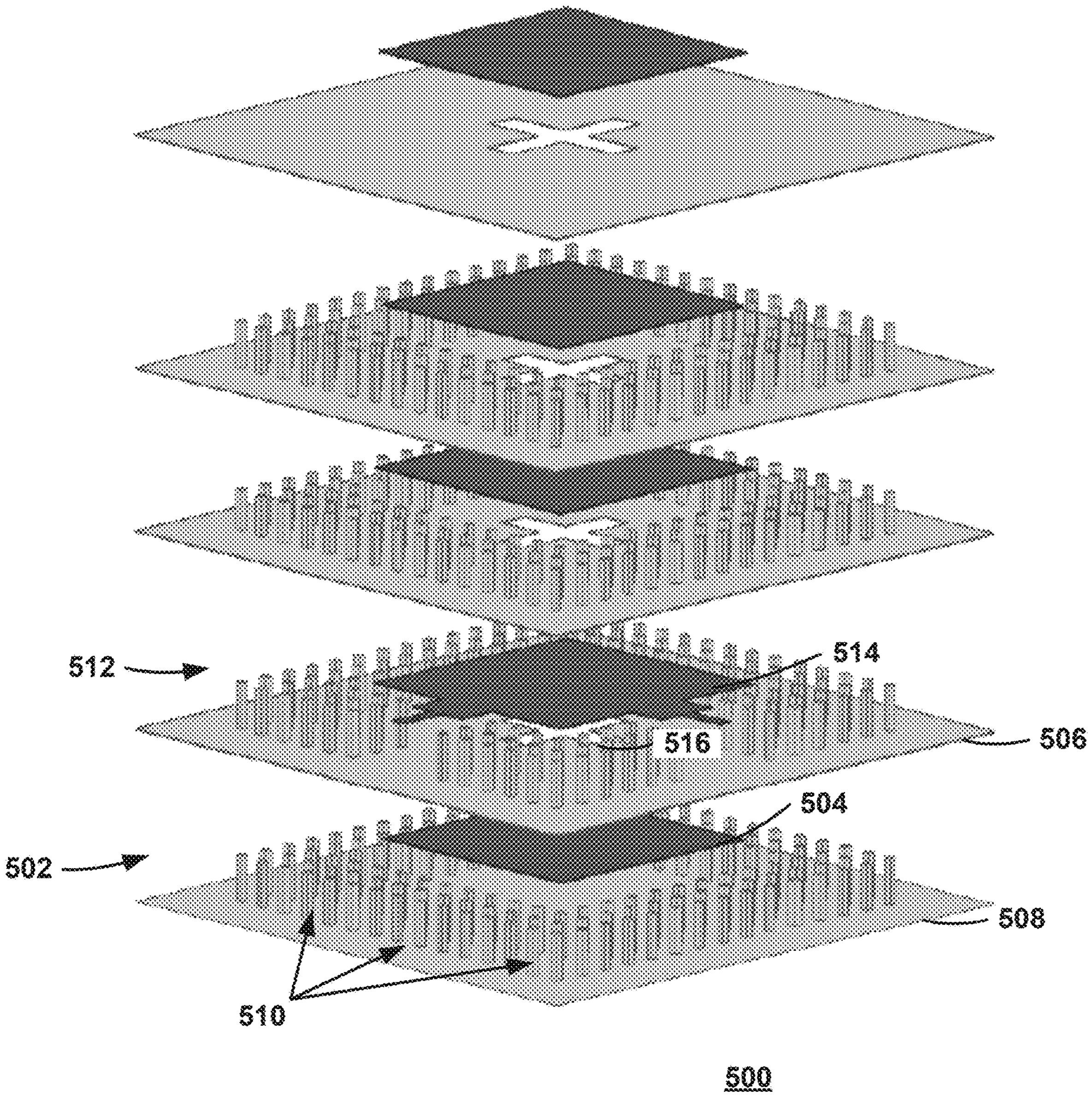
FIG. 5 is an illustration of an exploded perspective view of an example of an antenna apparatus with dual polarization and a resonating cavity generating a transmission zero in the transfer function for both polarizations.

FIG. 4A is an illustration of an exploded perspective view of an example of an antenna apparatus 400 with dual polarization. FIG. 4B is a cross-sectional top view of the antenna apparatus 400 taken along line B-B in FIG. 4A. The antenna apparatus 400 of FIG. 4A and FIG. 4B, therefore, is another example of the antenna apparatus 100 discussed above with reference to FIG. 1C. For the example of FIG. 4A and FIG. 4B, the antenna apparatus 400 has two inputs ports 402, 404 including a horizontal polarization input port 402 and a vertical polarization input port 404. Dual orientation is achieved by adjusting the dimensions of the same set of resonators and radiator and adjusting the shaping of the irises. Each iris 406, 408, 410 is a combination of two rectangular irises 412, 414 where the iris with the longer dimension that is perpendicular to the direction of an input port couples the signals from that input. Coupling from irises that have their longest dimension parallel to the direction of an input port is significantly less providing isolation between the two input ports and signals. Therefore, the first rectangular portion 412 of the iris having the length 416 perpendicular to the direction 418 of the horizontal input port 402 couples signals received at the horizontal input port 402. The second rectangular portion 414 of the iris having a length 420 perpendicular to the direction 422 of the vertical input port 404 couples signals received at the vertical input port 404. Each set of rectangular portions having the same orientation, the resonators, and radiator function as described with reference to FIG. 2A, FIG. 2B, FIG. 3A, and FIG. 3B. A FIG. 5 is an illustration of an exploded perspective view of an example of an antenna apparatus 500 with dual polarization and a resonating cavity (supplementary resonator) 502 generating a transmission zero in the transfer function for both polarizations. For the example of FIG. 5, the resonating cavity (supplementary resonator) 502 is formed with a metallic resonating patch 504 enclosed by the input resonator ground plane 506, another ground plane 508 and vias 510 connecting to the two ground planes 506, 508. The supplementary resonator is positioned on the opposite side of the input resonator 512 from the other resonators. The metallic resonating patch 504 is coupled to the input resonator resonating element 514 through an iris 516 in the input resonator ground plane 506. For the example, the iris 516 has the same shape an orientation as the other irises. From one perspective, the additional resonating cavity 502 provides a mechanism for eliminating the transmission of energy at and near a particular frequency. The metallic resonating patch 504 in resonating cavity 502 is singly coupled to the input resonator. This differs from the other resonators which are, at least doubly coupled, either to other resonators or the input and output of the structure. As a result, the energy at the resonant frequency of patch 504 is contained within the resonating cavity 502 and cannot continue towards the radiator to be radiated into free space. This is similar to the performance of extracted-pole filters, where singly coupled resonators are located at different stages of a filter to create transmission zeros in the frequency response.

Figure 6A:
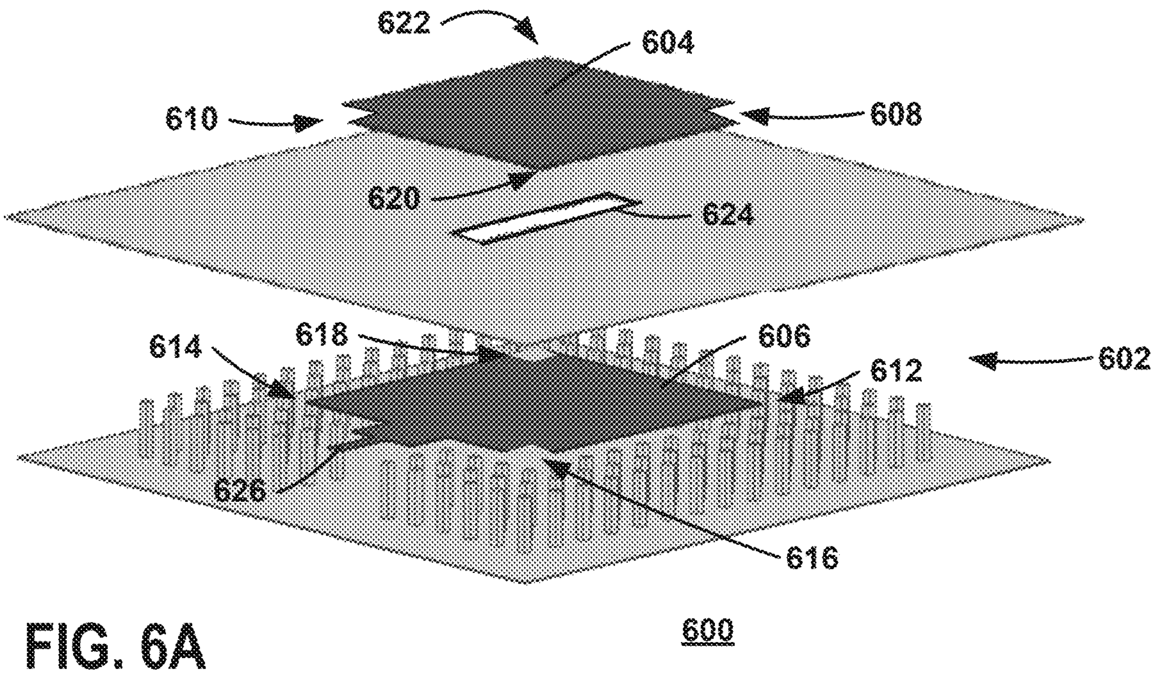
FIG. 6A is an exploded perspective view illustration of an example of an antenna apparatus having circular polarization.

FIG. 6A is an exploded perspective view illustration of an example of an antenna apparatus 600 having circular polarization. The antenna apparatus 600 of FIG. 6A is an example of the antenna apparatus 100 discussed above with reference to FIG. 1C where the intermediate cavity and the input cavity are a single cavity. Accordingly, the antenna apparatus 600 includes an input element supporting two resonances within the passband of the antenna and a radiator, also supporting two resonances within the passband of the antenna apparatus. For the example of FIG. 6A, therefore, the antenna apparatus includes a single cavity 602 and a radiator 604. The resonator element 606 and the radiator element 604 each have notches in corners that are diagonally opposite each other to provide coupling between the two resonances contained in each patch. The notched corners 608, 610 of the radiator element 604 are positioned above the corners 612, 614 of the resonator element 606 that are not notched. Accordingly, the two notched corners 616, 618 of the resonator element 606 are positioned directly below the corners 620, 622 of the radiator element 604 that are not notched. For the example of FIG. 6A, the iris 624 has an orientation such that the longer dimension is parallel to the direction of the input port 626. Circular polarization can be achieved by feeding two orthogonal linear polarizations with a 90° phase difference. This can be achieved with the structure shown in FIG. 6A, where the radiating patch sustains two linear polarizations. The insets in the corners provide coupling between the two resonances sustained by each patch. The 90° phase difference between polarizations and input matching in the desired passband is achieved by properly choosing the dimensions and location of the input pad, the dimensions of the two patches, the size of the insets, the size of the iris and the relative positions of the insets between both patches. With this configuration, a circularly polarized antenna with the same matching bandwidth as axial ratio bandwidth can be implemented.

Figure 6B:
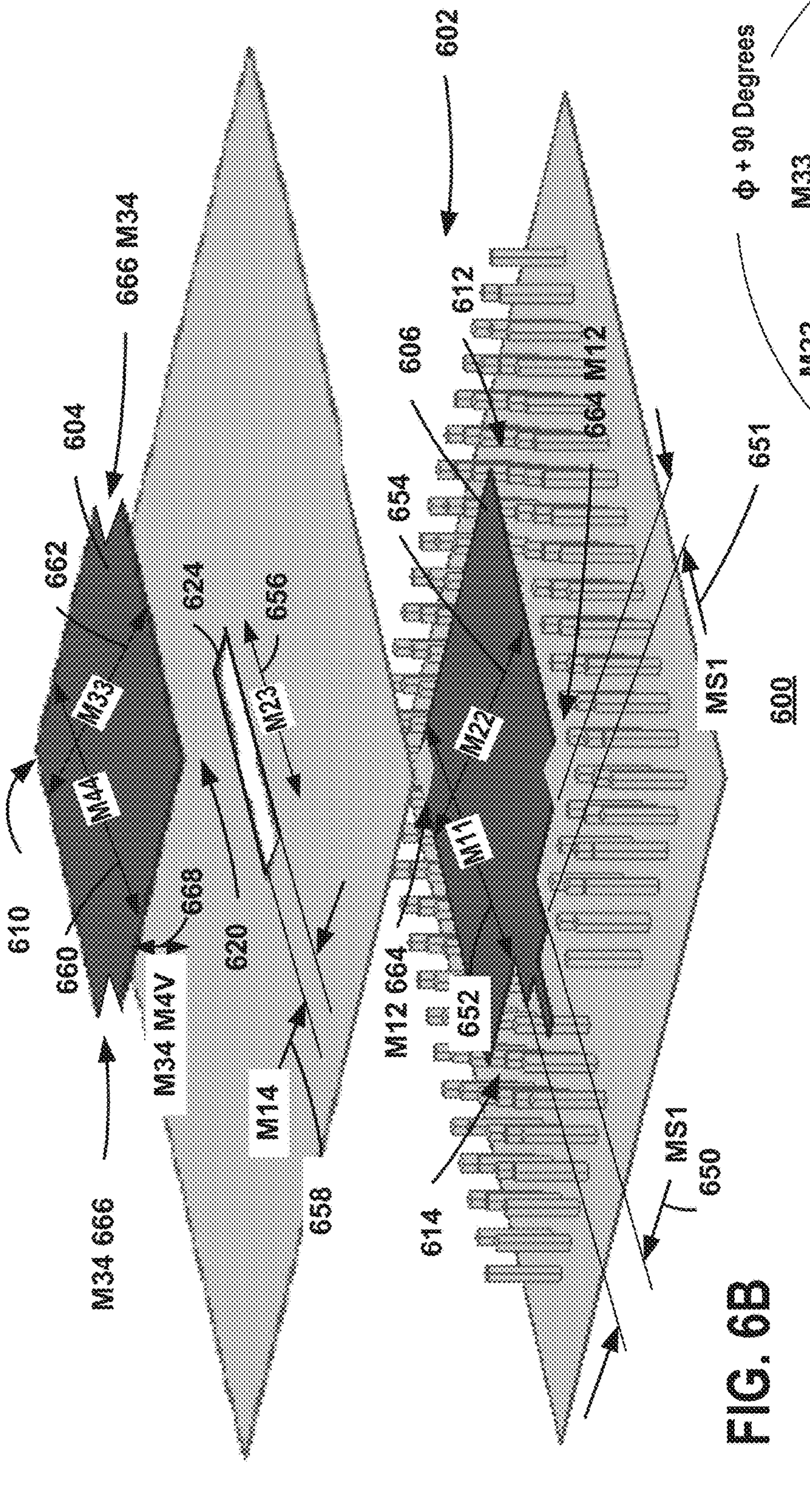
FIG. 6B is a perspective view illustration of the antenna apparatus showing modeling labels for an example of coupling matrix modeling.
Figure 6C:
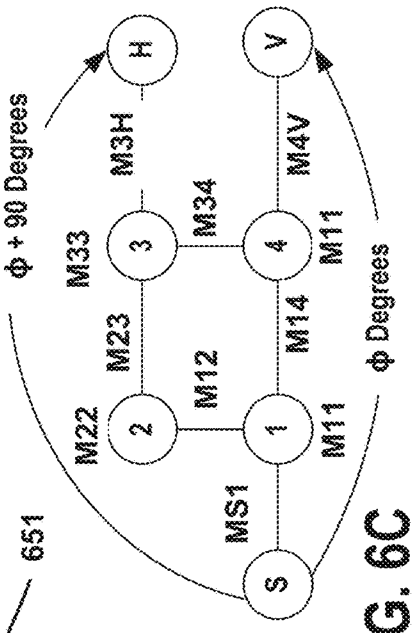
FIG. 6C is an illustration of the coupling matrix modeling relationship for the structure of FIG. 6B.

FIG. 6B is a perspective view illustration of the antenna apparatus 600 showing modeling labels for an example of coupling matrix modeling. FIG. 6C is an illustration of the coupling matrix modeling relationship for the structure of FIG. 6B. As discussed above a coupling matrix model is an example of a technique that can be applied to designing an antenna apparatus in accordance with the discussions herein. For the example, MS1 is at least partially based on the width 650 of the input port 626. MS1 can also be controlled by the length 651 of input port "step". In an example of a design technique, the width 650 is increased until the maximum input coupling is achieved. The length 651 is subsequently increased until the desired input coupling is achieved.

M11 and M22 are based on the length 652 and width 654 of the resonator element 606, respectively. M23 and M14 are based on the length 656 and width 658 of the iris 624, respectively. M44 and M33 are based on the length 660 and width 662 of the radiator element 604, respectively. M12 is based on the size 664 of the notched corners 616 and 622 of the resonator element 606. M34 is based on the size 666 of the notched corners 608 and 610 of the radiator element 604. M4V is based on the distance 668 between the radiator element and the adjacent ground.

Figure 7:
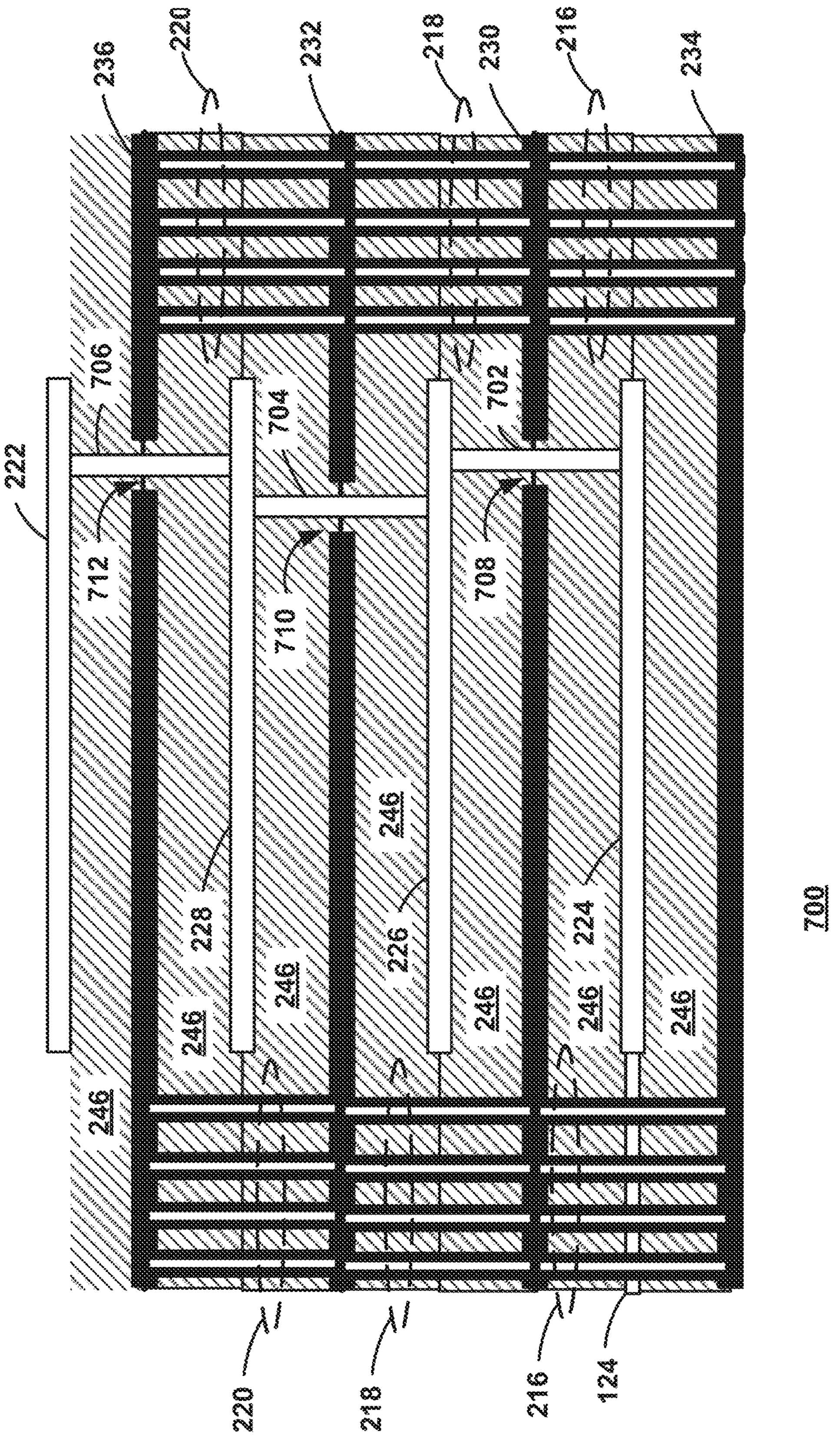
FIG. 7 is an illustration of a cross sectional side view of an example of an antenna apparatus including planar resonator elements between ground planes where the ground planes are connected with vias and where vias through the ground planes provide coupling between the resonator elements.

FIG. 7 is an illustration of a cross sectional side view of an example of an antenna apparatus 700 including planar resonator elements between ground planes where the ground planes are connected with vias and where vias through the ground planes provide coupling between the resonator elements. The structure and operation of the antenna apparatus 700 of FIG. 7 is similar to the antenna apparatus 200 discussed above except that the couplings are formed with vias 702, 704, 706 instead of irises. The input resonator element 224 is coupled to the first intermediate resonator element 226 by a metallic post or via 702 that passes through an opening 708 within the ground plane 230 between the two resonator elements 224, 226. The first intermediate resonator element 226 is coupled to the second intermediate resonator element 228 by a metallic post or via 704 that passes through an opening 710 within the ground plane 232 between the two resonator elements 226, 228. The second intermediate resonator element 228 is coupled to the radiator element 222 by a metallic post or via 706 that passes through an opening 712 within the ground plane 236 between the resonator elements 228 and the radiator element 222. The modeling and design techniques discusses above can be used for the antenna apparatus 700 where the vias are represented with the appropriate coupling characteristics. For the example of FIG. 7, the location and dimensions of the vias control the coupling between adjacent resonators.

Figure 8A:
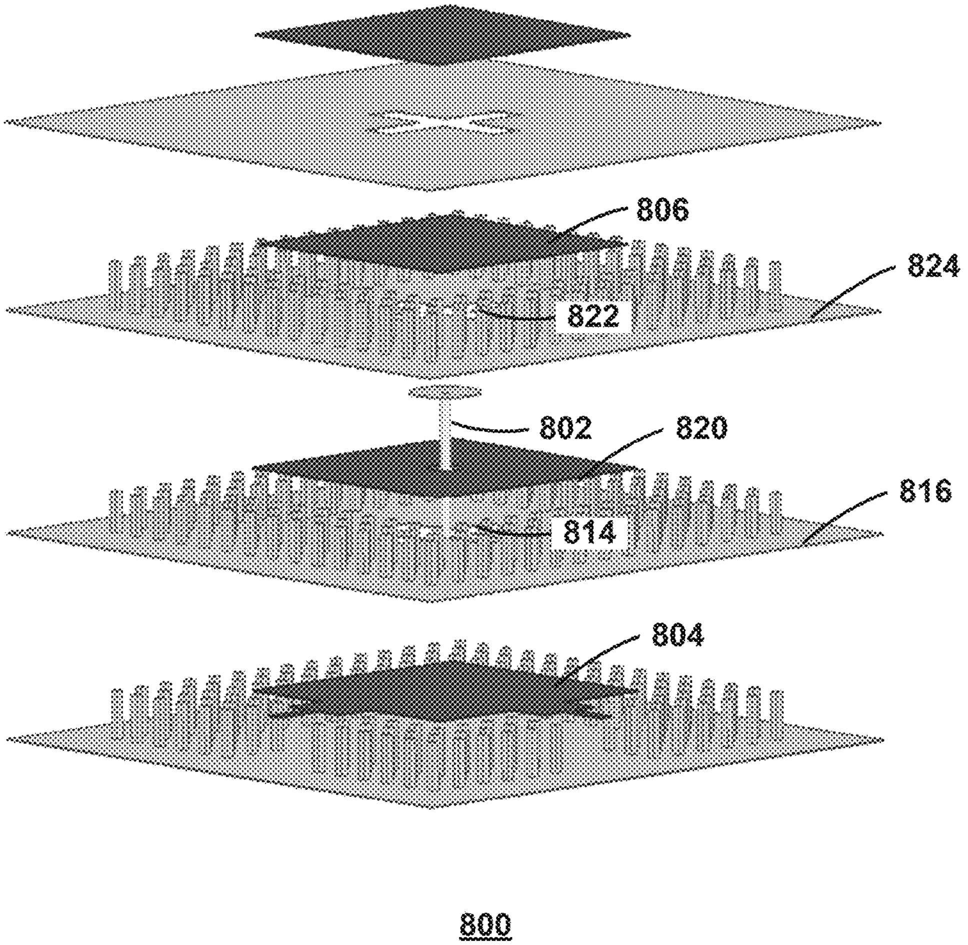
FIG. 8A is an illustration of an exploded perspective view and of an example of an antenna apparatus including planar resonator elements between ground planes where the ground planes are connected with vias and where non-adjacent resonator elements are coupled through a dumbbell coupler.
Figure 8B:
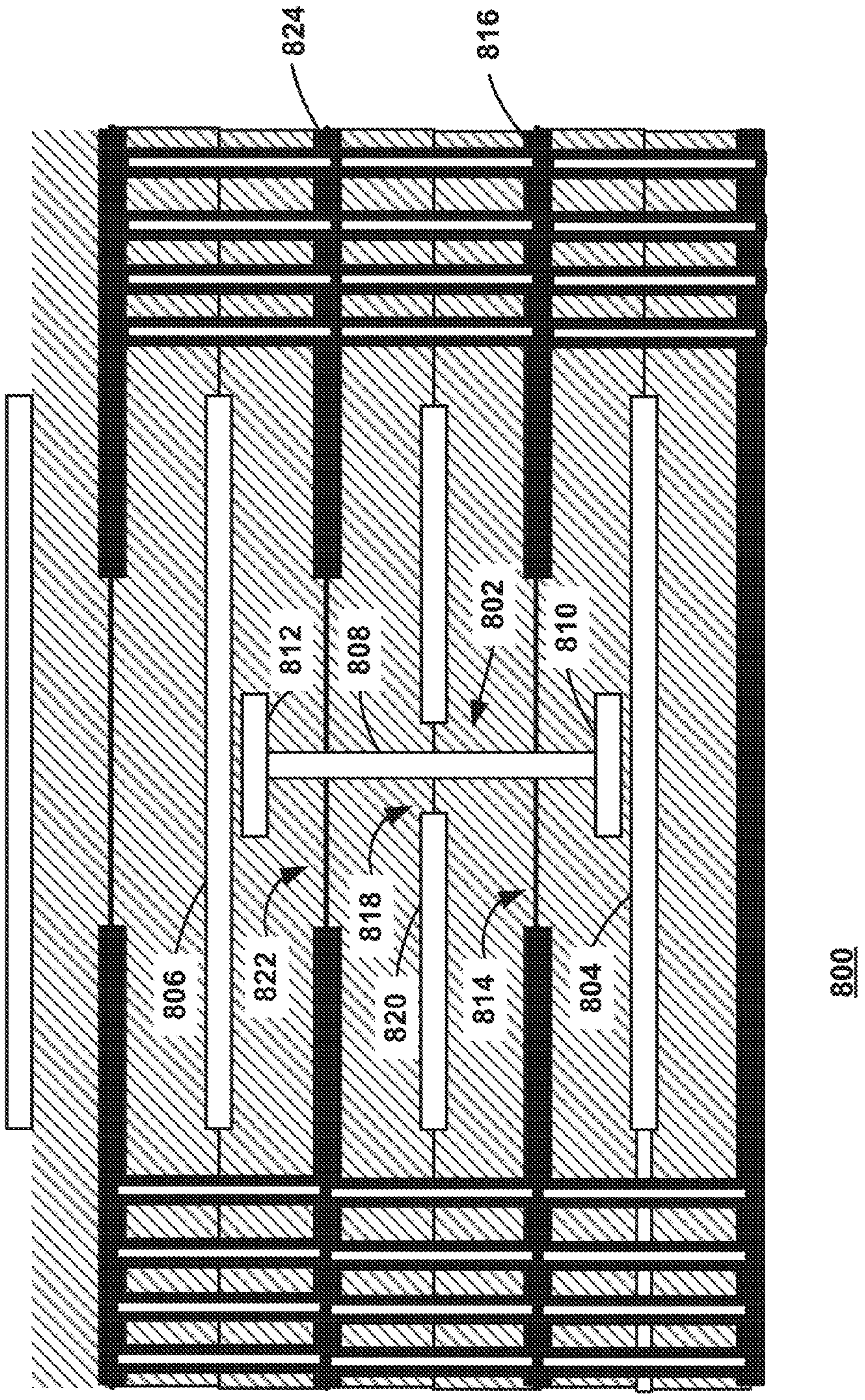
FIG. 8B is an illustration of a cross sectional side view of the antenna apparatus.

FIG. 8A is an illustration of an exploded perspective view and of an example of an antenna apparatus 800 including planar resonator elements between ground planes where the ground planes are connected with vias and where non-adjacent resonator elements are coupled through a dumbbell coupler. FIG. 8B is an illustration of a cross sectional side view of the antenna apparatus 800. The structure and operation of the antenna apparatus 800 are similar to the antenna apparatus 400 discussed above except that a dumbbell 802 coupler couples the input resonator element 804 to the second intermediate resonator element 806. The dumbbell coupler 802 may be formed with a metallic post or via 808 connected between to patches 810, 812. For the example of FIG. 8, the via 808 passes through the iris 814 in the ground plane 816, through an opening 818 in the first resonator element 820 and through the iris 822 in the ground plane 824. Therefore, the non-adjacent coupling due to the dumbbell coupler is in addition to the coupling through the irises. Non-adjacent coupling allows for generating a transmission zero in the transfer function providing more flexibility in designing the antenna apparatus.

Figure 9:
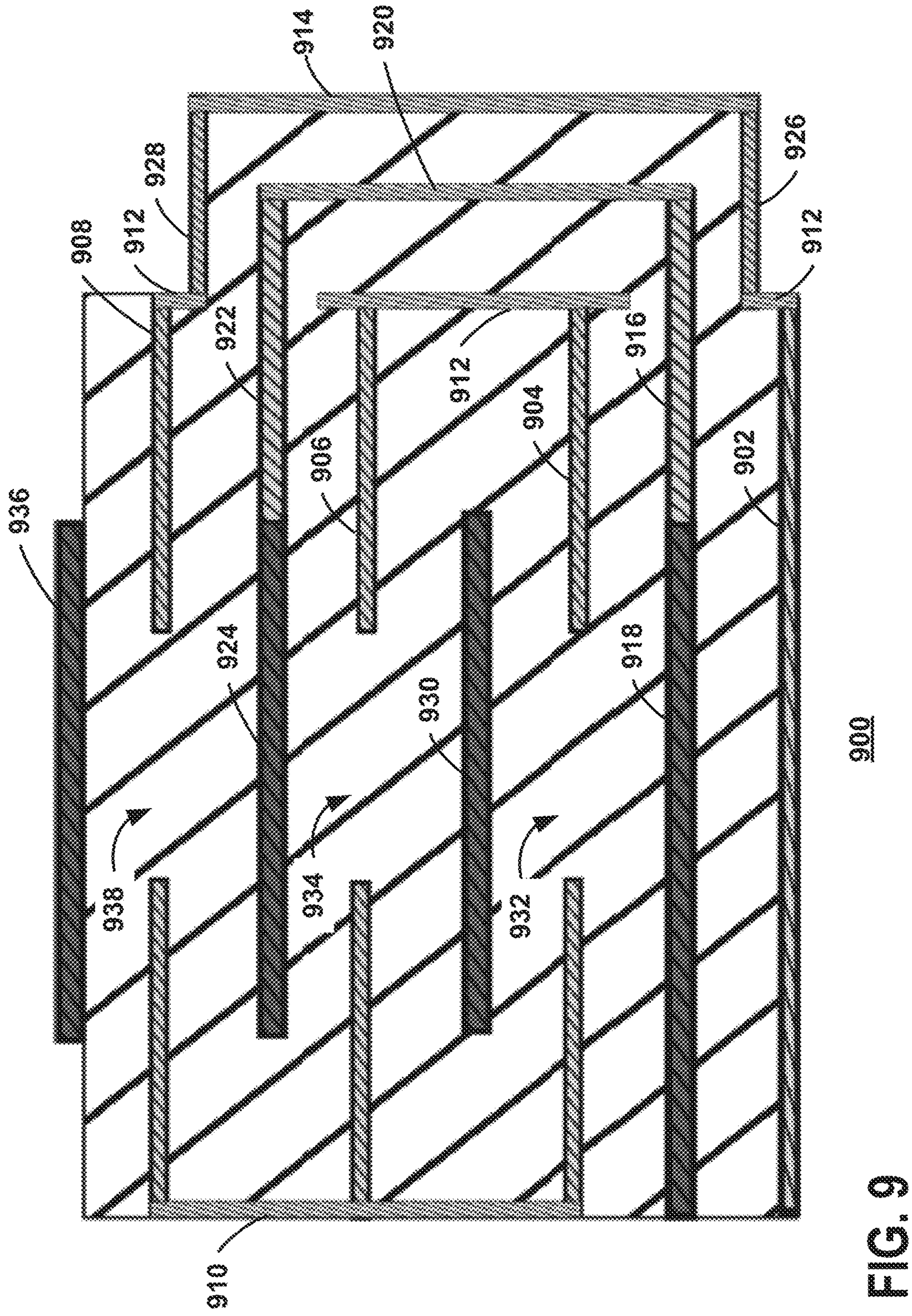
FIG. 9 is an illustration of a cross sectional side view of an example of an antenna apparatus with non-adjacent cross-coupling implemented by vias and metal strips.

FIG. 9 is an illustration of a cross sectional side view of an example of an antenna apparatus 900 with non-adjacent cross-coupling. The structure and operation of the antenna apparatus 900 are similar to the antenna apparatus 200 discussed above except that striplines and vias are used to couple non-adjacent resonators. For the example, the ground planes 902, 904, 906, 908 are connected to each other with a plurality of vias 910, 912 and the lower ground plane 902 is connected to the upper ground plane 908 with a plurality of vias 914. The vias 910, 912, 914 are shown as sidewalls in FIG. 9 although they may contain multiple staggered rows of vias.

For the example, striplines connect two non-adjacent metallic resonator patches forming the resonator elements to vias that connect the striplines, thereby coupling the two resonator elements. A stripline 916 connects the input resonator metallic patch resonator 918 to a via 920 and a stripline 922 connects the second intermediate metallic patch resonator 924 to the via 920. As a result, the input resonator metallic patch resonator 918 is coupled to the second intermediate metallic patch resonator 924.

In order to further shield the via 920, the lower ground plane 902 is connected to the vias 914. For the example, the lower ground plane 902 is connected to the vias 914 through a metal plane 926 and the upper ground plane 908 is coupled to the vias 914 through another metal plane 928. In addition to the coupling between non-adjacent resonator elements 918, 924, the exemplary structure of FIG. 9 includes coupling between adjacent resonators as discussed above in other examples. The input resonator element 902 is coupled to the first intermediate resonator element 930 through an iris 932. The first intermediate resonator element 930 is coupled to the second intermediate resonator element 924 through an iris 934. The second intermediate resonator element 924 is coupled to the radiator element 936 through an iris 938.

Therefore, by properly selecting dimensions of couplings and patches and the distance between the radiator and the adjacent resonator, the antenna apparatus can be designed to function as a direct coupled resonator filter and antenna. Transmission zeros can be introduced to the transfer function by implementing non-adjacent coupling using vias, dumbbell probes or an additional resonator adjacent to the input resonator and opposite the other resonators. The integrated structure allows for the filter and antenna to be implemented in a compact format that has significant implications in at least some implementations. For example, an antenna apparatus having the appropriate filter characteristics and antenna radiation pattern and polarization can be implemented within an area having dimensions less than a half wavelength across at the operating frequency.

Figure 10A:
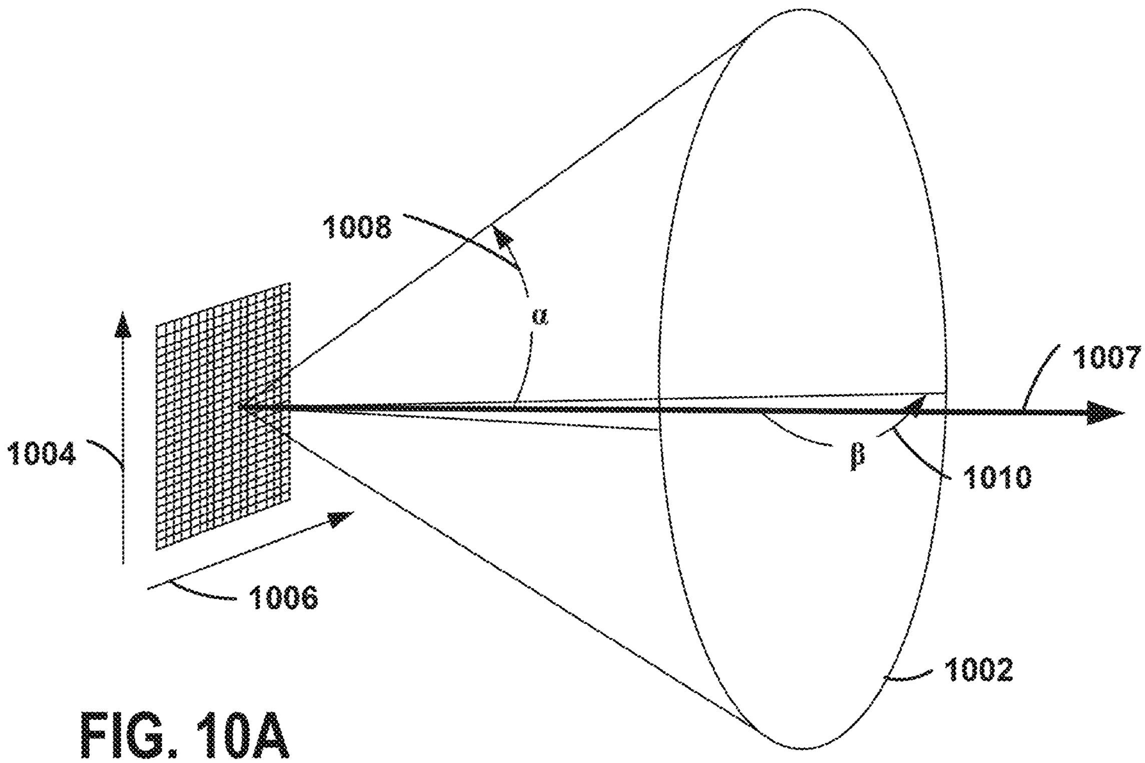
FIG. 10A is an illustration of a perspective view an example of a phased array antenna and associated scan volume antenna pattern.
Figure 10B:
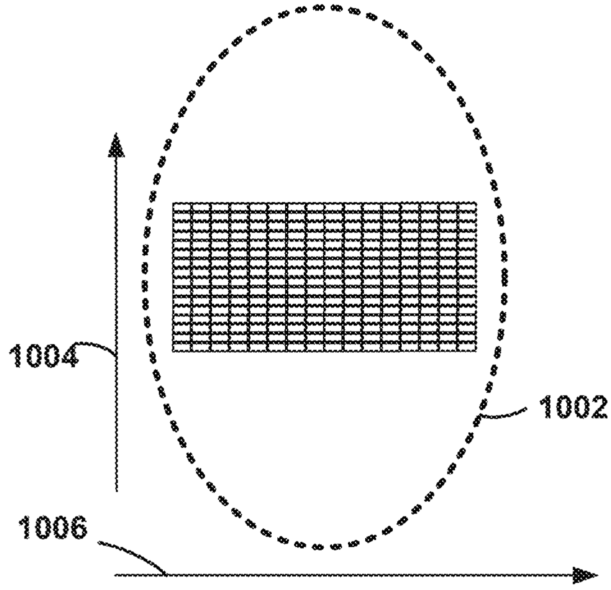
FIG. 10B is an illustration of a top view the example of the phased array antenna and associated scan volume antenna pattern.
Figure 10C:
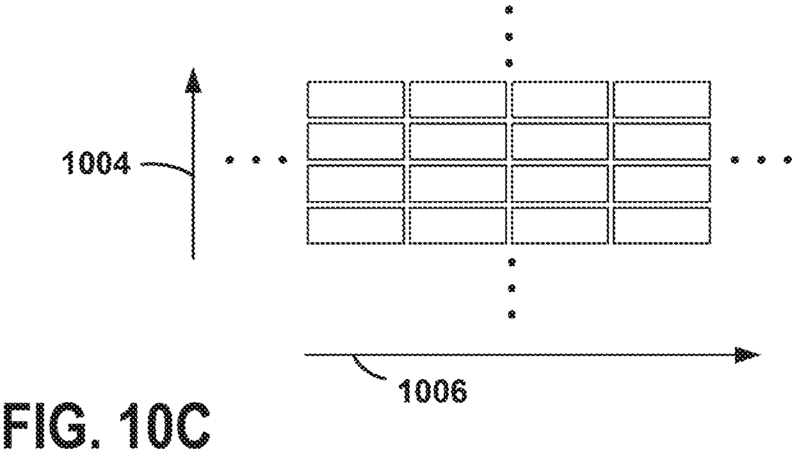
FIG. 10C is an illustration of a top view of a portion of the phased array antenna.
Figure 10D:
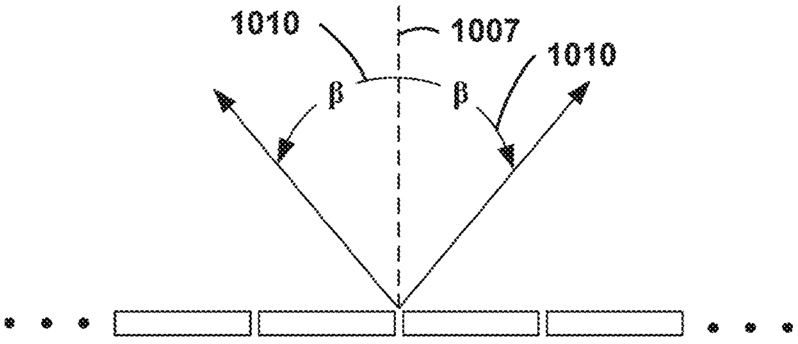
FIG. 10D is an illustration of a front view of the portion of the phased array antenna.
Figure 10E:
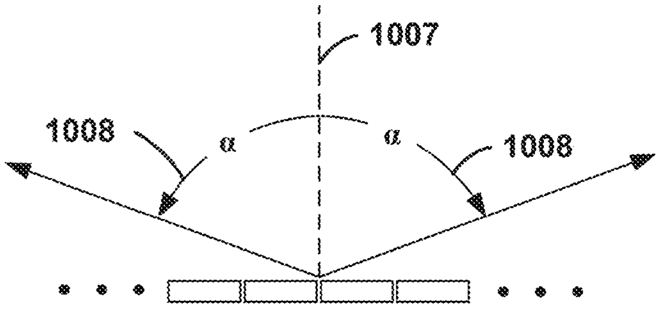
FIG. 10E is an illustration of a side view of the portion of the phased array antenna 1000.

FIG. 10A is an illustration of a perspective view and FIG. 10B is an illustration of a top view of an example of a phased array antenna 1000 and associated scan volume of the antenna 1002. FIG. 10C is an illustration of a top view, FIG. 10D is an illustration of a front view, and FIG. 10E is an illustration of a side view of a portion of the phased array antenna 1000. The scan volume 1002 represents the portion of space where the antenna 1000 can orient its radiated energy. The phased array antenna 1000 includes a plurality of antenna elements where each antenna element is an antenna apparatus with an integrated filter. Accordingly, the phased array antenna 1000 is an example of the phased array antenna 10 discussed above. For the example of FIG. 10A and FIG. 10B, the phased array antenna 1000 has a first grid spacing in a first orientation 1004 and second grid spacing in a second orientation 1006 where the second grid spacing 1006 is greater than the first grid spacing 1004. The scan angle of a phased array antenna is the maximum angle from the bore sight 1007 for a selected signal strength or antenna gain. Since the maximum scan angle is at least partially dictated by the grid spacing, the scan angle ($\alpha$) 1008 in the first orientation 1004 is greater than the scan angle ($\beta$) 1010 in the second orientation 1006 and the scan volume 1002 is elliptical. In examples where the grid spacing is the same in both orientations, the antenna pattern 1002 may be circular.

Phased array antennas are composed of several antennas which can be independently controlled. Working together, the individual antennas, or elements, can be connected to individual transmitters and receivers or groups or transmitters and receivers. The electromagnetic waves radiated by each individual antenna combine and superpose, constructively interfering (adding together) to enhance the power radiated in desired directions, and destructively interfering (cancelling) to reduce the power radiated in other directions. When used for receiving, the separate electromagnetic currents from the individual antenna elements combine in the receiver with the correct phase relationship to enhance signals received from the desired directions and cancel signals from undesired directions. Phased arrays contain components to control the amplitude and phase of each element to enable "phased" steering. In other words, the array is mechanically stationary while the electromagnetic waves are electronically steered. Active Electronically Phased Array (AESA) include active elements placed within the phased array. The phased nature and subsequent coupling of the antenna elements place additional requirements of active impedance control to the antenna elements. The requirements for phased steering determine the element spacing and are typically around a half-wavelength at the upper end of the operational spectrum. Phased array antennas allow for more efficient use of frequency spectrum and help meet the demands of conventional communication systems. Conventional techniques, however, are limited in that the required filtering on each antenna element within the array cannot be achieved while meeting other requirements related to parameters such as sidelobe level, active return loss, efficiency, array gain, and scan volume. The antenna apparatus and techniques described herein, however, enable the implementation of phased array antennas that meet these requirements.

One example of a suitable technique for designing the phased array antenna includes using a circuit simulator application where one or more dimensions are selected to obtain a particular characteristic and systematically setting other dimensions to adjust and compensate other characteristics. In an example of a suitable technique for designing an antenna array, design begins from the filter specifications and the required scan volume. From the scan volume, the grid spacings in azimuth and elevation are determined, along with the maximum distance between the radiator patch and the planar metallic ground. From these values, the maximum output coupling of the filter is computed, and a circuit model based on the coupling, a coupling matrix is synthesized to fulfill the filter specifications under the constraint of a maximum output coupling value. From this circuit model, the dimensions of the structure are obtained as described above in reference to design of an individual antenna element (antenna apparatus).

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. An apparatus comprising:

an input planar resonator element having an input port;

a planar radiator disposed in a plane and electrically coupled to the input planar resonator element; and a planar ground element disposed between the planar radiator and the input planar resonator element, the apparatus configured to radiate, when an electromagnetic signal is applied to the input port, electromagnetic energy from the planar radiator in accordance with a transfer function from the input port through the planar radiator to free space, the transfer function determined at least in part by a distance between the planar radiator and the input planar resonator element, wherein the planar radiator is not direct current (DC) connected to the planar ground element.

2. The apparatus of claim 1, wherein an output coupling to free space of the transfer function is at least partially based on a distance between the planar radiator and the planar ground element.

3. The apparatus of claim 1, wherein an opening in the planar ground element creates a coupler to electrically couple the input planar resonator element to the planar radiator.

4. The apparatus of claim 1, wherein a metallic post through an opening in the planar ground element connects the input planar resonator element to the planar radiator to electrically couple the input planar resonator element to the planar radiator.

5. The apparatus of claim 1, wherein the input planar resonator is within a resonator enclosure formed by the ground plane element and another ground plane element connected by a set of metallic posts.

6. The apparatus of claim 1, wherein the apparatus is configured to radiate electromagnetic energy from the planar radiator in accordance with circular polarization when an electromagnetic signal is applied to the input port.

7. The apparatus of claim 6, wherein the input planar resonator element has another input port, the apparatus configured to radiate electromagnetic energy from the planar radiator in accordance with right hand circular polarization (RHCP) when the electromagnetic signal is applied to the input port and to radiate electromagnetic energy from the planar radiator in accordance with left hand circular polarization (LHCP) when the electromagnetic signal is applied to the another input port.

8. The apparatus of claim 1, further comprising:

an outer enclosure surrounding the apparatus except for an input opening providing access to the input port and a radiation opening exposing the planar radiator.

9. The apparatus of claim 1, wherein the planar radiator is less than one half wavelength along each side of the planar radiator at a frequency of the electromagnetic signal in free space.

10. An apparatus comprising:

an input resonator element having an input port;

a planar radiator disposed in a plane and electrically coupled to the input resonator element; and a ground element disposed between the planar radiator and the input resonator element, the apparatus configured to radiate, when an electromagnetic signal is applied to the input port, electromagnetic energy from the planar radiator in accordance with a transfer function from the input port through the planar radiator to free space, the transfer function determined at least in part by a distance between the planar radiator and the input resonator element, wherein the planar radiator is not direct current (DC) connected to the ground element.

11. The apparatus of claim 10, wherein an output coupling to free space of the transfer function is at least partially based on a distance between the planar radiator and the ground element.

12. A phased array antenna comprising a plurality of the apparatus according to claim 1.

13. A phased array antenna comprising a plurality of the apparatus according to claim 10.

14. The apparatus of claim 1, wherein the planar radiator is an electrically conductive sheet.

15. The apparatus of claim 1, wherein the planar radiator is a conductive radiator patch.

16. The apparatus of claim 10, wherein the planar radiator is an electrically conductive sheet.

17. An apparatus comprising:

an input resonator element having an input port;

a radiator formed by a single conductive sheet disposed in a single plane and electrically coupled to the input resonator element; and a ground element disposed between the radiator and the input resonator element, the apparatus configured to radiate, when an electromagnetic signal is applied to the input port, electromagnetic energy from the radiator in accordance with a transfer function from the input port through the conductive radiator patch to free space, the transfer function determined at least in part by a distance between the conductive radiator patch and the input resonator element, wherein the radiator is not direct current (DC) connected to the ground element.

* * * * *